Patented July 27, 1937

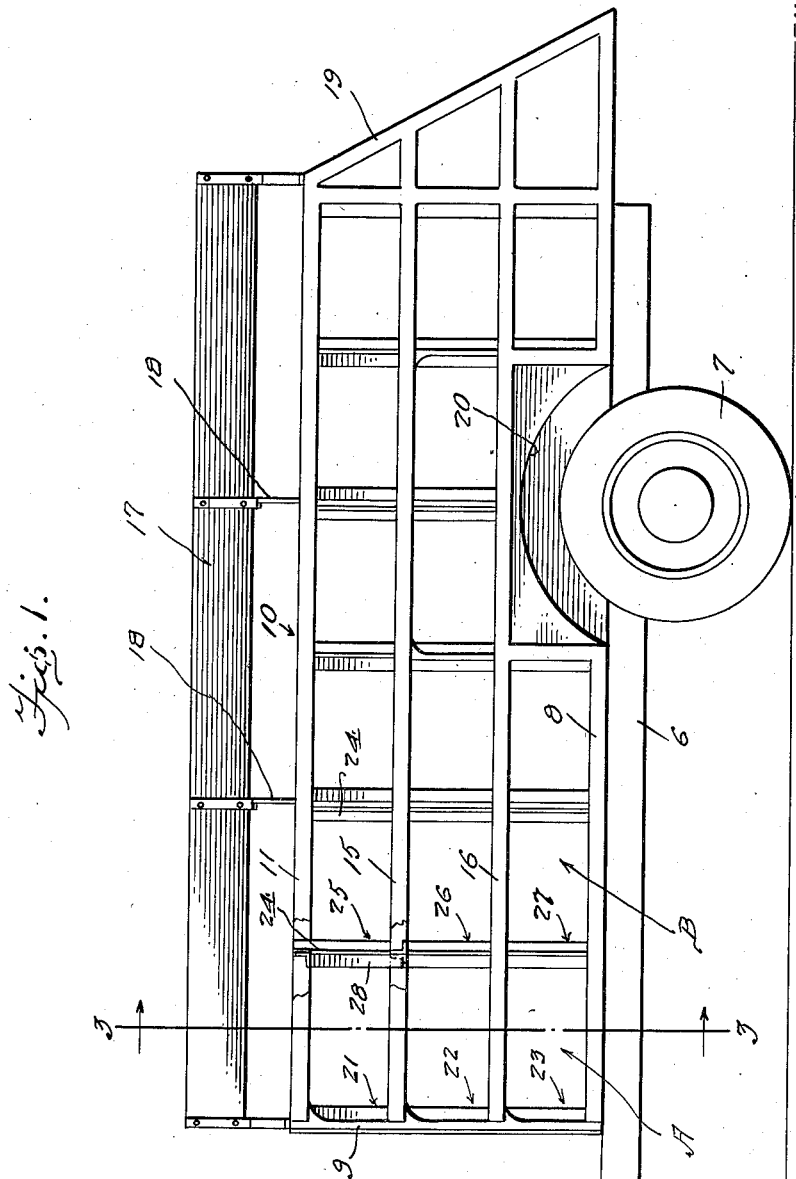

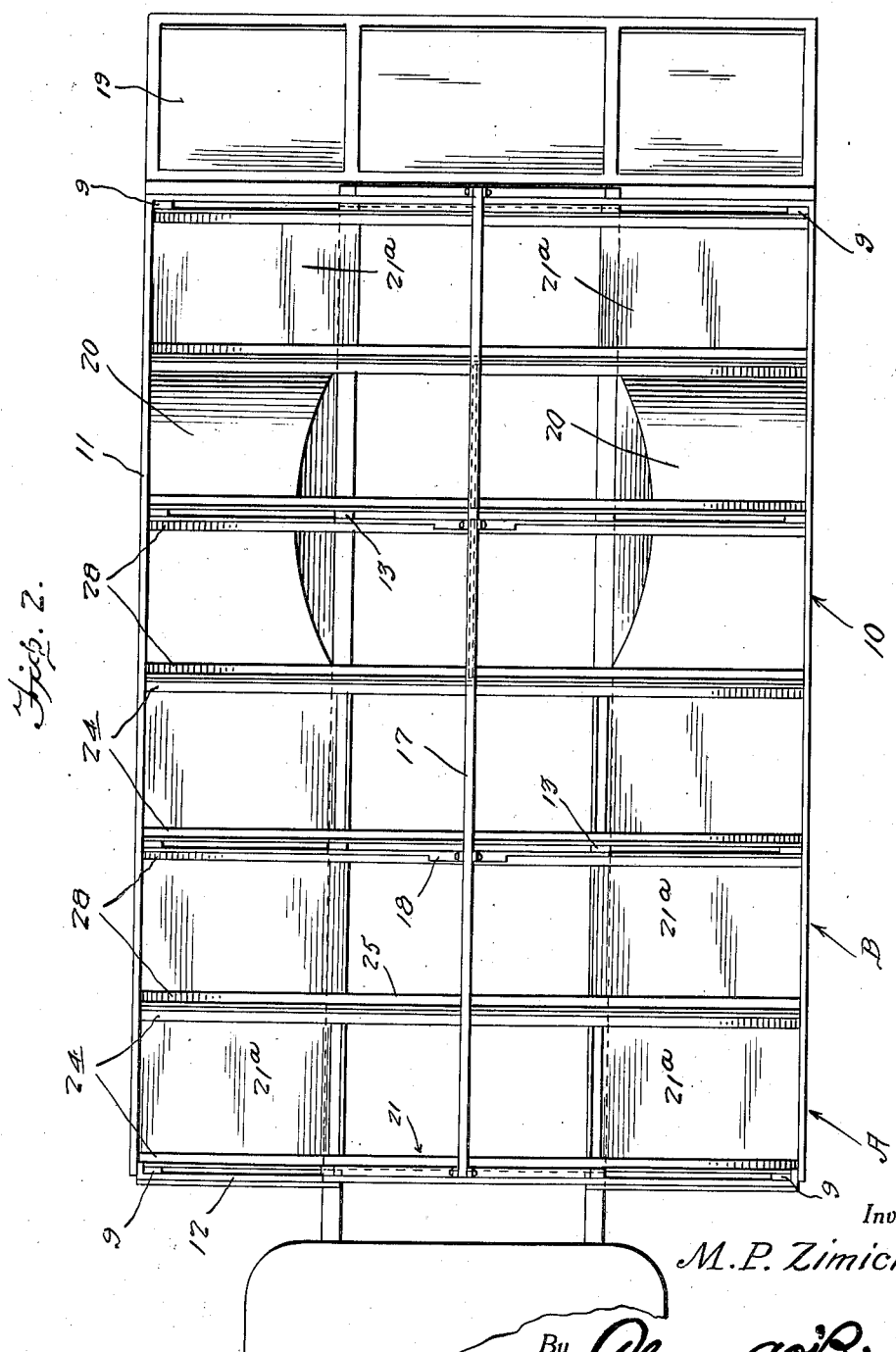

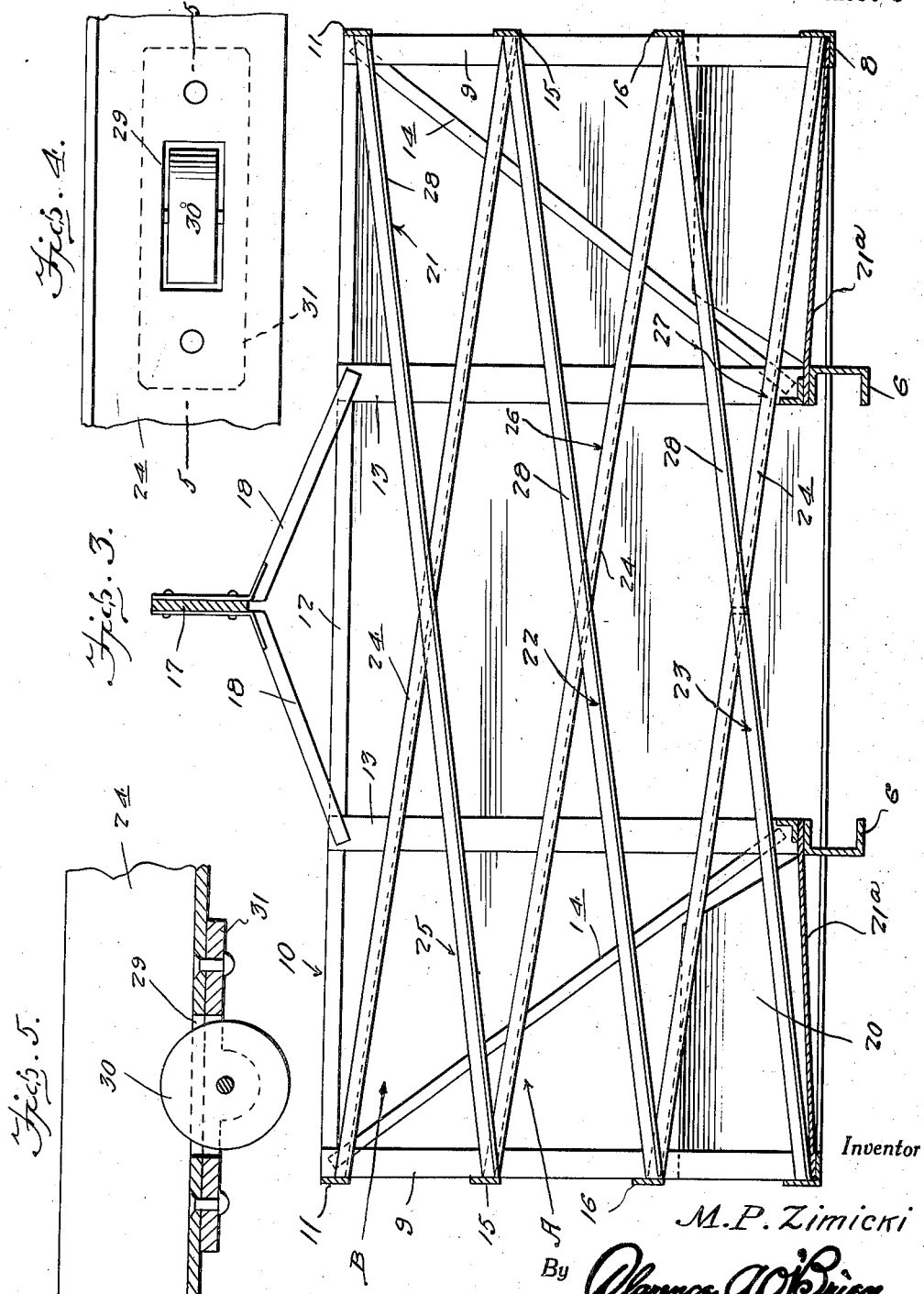

2,088,078

UNITED STATES PATENT OFFICE 2,088,078

TRUCK BODY

Marche Paul Zimicki, Strawn, Tex.

Application January 28, 1937, Serial No. 122,862

2 Claims. (Cl. 214—85)

This invention relates to what is believed to be a new and novel all-metal vehicle or truck body of a type aptly fitted for accommodating and transporting crated bottled goods, such as soft drinks and the like.

Needless to say, I am sufficiently conversant with the prior state of the art and the trade in general to appreciate open-work, rack-type bodies are not broadly new in crate carrying trucks. It follows, therefore, that, after due deliberation and consideration, I have discovered the need for a specifically new type body structure, and in reducing the idea to practice, I have perfected an ingenious adaptation of features not only aptly fitted for the purposes intended, but decidedly efficient in expediting the handling of crated bottled goods with requisite expedition. It follows, therefore, that my primary aim is to generally improve upon known structures by providing an arrangement characterized by appreciable structural refinements and improvements calculated to permit the desired results to be more successfully and reliably accomplished.

Briefly, the preferred embodiment of the invention relies for novelty and distinctiveness on the adoption and use of an open-work, cage-like main frame having supported within its limits a plurality of crate-accommodating and racking tracks, the tracks being assembled in superposed order so that the crates may be arranged in vertical tiers, and said adjacent superposed groups of tracks being alternately inclined to slidably accommodate the crates so that the tracks in effect are confining chutes.

Other features and advantages will become more readily apparent from the following description and drawings.

In the drawings, wherein like numerals are employed to designate like parts throughout the same:

Figure 1 is a side elevational view of a crate-accommodation truck body constructed in accordance with the principles of the present invention.

Figure 2 is a top plan view of Figure 1.

Figure 3 is an enlarged transverse vertical sectional view taken approximately on the plane of the line 3—3 of Figure 1.

Figure 4 is a fragmentary plan view of one of the track-forming angle irons showing a modification wherein the same is provided with an anti-friction roller.

Figure 5 is a section on the line 5—5 of Figure 4.

In the drawings, in Figure 1, the chassis of the vehicle is denoted by the numeral 6. This is supported by wheels 7. The chassis is shown to advantage in Figure 3 and is indicated as comprising a pair of spaced parallel channel irons forming the sole support for the cage-like racking crate-accommodation body.

In order to successfully visualize the body construction, it is well to assume that it comprises a substantially rectangular, open-work frame which surrounds or which is provided within itself with the various crate-racking tracks. More specifically, however, the lower horizontal frame unit in the frame structure is denoted by the numeral 8. Rising from the corners of this are vertical uprights or posts 9 of which there are four in number. Surrounding the upper ends of the posts 9 is a rimming frame 10 which forms the top frame unit, and this includes longitudinal top frame unit, and this includes longitudinal metal strips 11 and transverse or end members 12. The numerals 13 indicate auxiliary supporting posts or struts, and the numerals 14 represent suitable diagonal braces. This framework also includes intermediate horizontal strips 15 and 16, these being spaced apart the requisite distances to allow the bottle-filled crates (not shown) to be inserted and removed in an obvious manner.

The frame means further includes additional accessories not necessarily essential to the real novelty to be hereinafter described. It is advisable, however, to point out that on the top of the cage-like frame is an advertising name panel 17, this being centrally supported in place by appropriate members 18. Then, too, the rear end portion of the frame structure is inclined rearwardly and downwardly, as indicated at 19, and is properly paneled to provide advertising space. Moreover, the portions of the frame overlying the wheels 7 are provided with wheel guards 20 of appropriate construction. Then, too, it is optional in some instances to provide the lower overhanging portions of the frame with closing plates or shields 21, as shown in Figure 3. In other words, the portions of the frame which extend outwardly beyond the channel irons 6, and especially those portions within the vicinity of the rotating wheels, may be provided with these closing plates 20 to serve as mud shields. It is evident, however, that the entire frame unit may be left completely open, with the exception of the wheel guards 20.

The essence of the invention resides in the track assemblies confined within the limits of said cage-like frame structure. The arangement may be visualized as comprising a series of vertical, longitudinally disposed crate racks, each rack allowing the crates to be stacked vertically in tiers. One racking tier adjacent the cab of the vehicle is indicated at A, and the next adjacent one at B. The same principle of construction described in connection with these two is reproduced alternately throughout the remainder of the frame structure. That is to say, in the so-called tier A I provide a plurality of superposed inclined tracks, the same being differentiated in vertical order by the numerals 21, 22, and 23. Each track is composed of a pair of spaced parallel angle irons 24, and the entire series of tracks 21 to 23 are disposed in parallelism one above the other, each track being downwardly inclined for example from left to right in Figure 3. The track group comprised in the next adjacent tier B embodies complemental superposed tracks which may be distinguished by the numerals 25, 26, and 27. Here, again, the respective tracks are composed of spaced parallel angle irons which for convenience are differentiated by the numerals 28. It will observed that the angle irons 28 slant in a direction opposite to the angle irons 24 and intersect said irons 24 at about the center of the structure. In both instances the angle irons 24 and 28 have their outer ends closed by the straps or metal strips 15—16 forming complemental parts of the surrounding cage. It is evident, therefore, that a battery of crates may be racked in the tier A or in the tier B on the respective tracks contained therein. The inclination of the tracks in opposite directions facilitates gravitation of the crates to the extent that said tracks are in effect inclined racking chutes. To facilitate loading the various angle irons may be apertured at longitudinally spaced points, as indicated at 29 in Figures 4 and 5. Then a roller 30 may be projected in through the opening, the roller being supported on an appropriate bracket 31. These rollers facilitate sliding the crates from the upper ends of the respective chutes or tracks down to the opposite lower ends. Consequently, the crates are placed in at the upper ends and removed at the lower ends. It is further obvious that when removing one crate at the lower point of elevation, for example, the next succeeding crate behind it goes down and takes its place. By thus putting the crates in at the upper ends and removing them at the opposite ends, the task of handling the same is materially reduced. This accessibility and expedition is, therefore, the cardinal factor of the unique track or chute arrangement.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A truck body comprising an open work frame forming a longitudinally extending row of transversely extending compartments, superimposed inclined tracks in each compartment extending from one side to the other side of the frame, the tracks of alternate compartments sloping in one direction and the tracks of the other compartments sloping in an opposite direction and longitudinally extending strips at the sides of the frame extending across the ends of the tracks and projecting above the tracks.

2. A truck body comprising an open work frame forming a longitudinally extending row of transversely extending compartments, superimposed inclined tracks in each compartment extending from one side to the other side of the frame, the tracks of alternate compartments sloping in one direction and the tracks of the other compartments sloping in an opposite direction and longitudinally extending strips at the sides of the frame extending across the ends of the tracks and projecting above the tracks, each track comprising a pair of angle iron rails having openings in the horizontal flanges and wheels carried by said flanges and projecting through the openings.

MARCHE PAUL ZIMICKI.